(12) United States Patent
Kamble et al.

(10) Patent No.: US 10,193,930 B2
(45) Date of Patent: Jan. 29, 2019

(54) APPLICATION SECURITY CAPABILITY EXCHANGE VIA THE APPLICATION AND DATA PROTECTION LAYER

(71) Applicant: Avocado Systems Inc., San Jose, CA (US)

(72) Inventors: Keshav Govind Kamble, San Jose, CA (US); Amitabh Sinha, Fremont, CA (US)

(73) Assignee: AVOCADO SYSTEMS INC., San Jose, CA (US)

( * ) Notice: Subject to any disclaimer, the term of this patent is extended or adjusted under 35 U.S.C. 154(b) by 170 days.

(21) Appl. No.: 15/197,635

(22) Filed: Jun. 29, 2016

(65) Prior Publication Data

US 2017/0006065 A1 Jan. 5, 2017

Related U.S. Application Data

(60) Provisional application No. 62/185,879, filed on Jun. 29, 2015.

(51) Int. Cl.
*G06F 21/00* (2013.01)
*H04L 29/06* (2006.01)

(52) U.S. Cl.
CPC .......... *H04L 63/20* (2013.01); *H04L 63/1433* (2013.01); *H04L 63/1441* (2013.01)

(58) Field of Classification Search
CPC .. H04L 63/20; H04L 63/1441; H04L 63/1433
See application file for complete search history.

(56) References Cited

U.S. PATENT DOCUMENTS

| | | |
|---|---|---|
| 6,694,434 B1 | 2/2004 | McGee et al. |
| 7,530,072 B1 | 5/2009 | Cheaz |
| 7,788,480 B2 | 8/2010 | Winget et al. |
| 7,895,642 B1 | 2/2011 | Larson et al. |
| 8,776,168 B1 * | 7/2014 | Gibson ................ H04L 63/104 709/225 |
| 9,077,617 B1 | 7/2015 | Seth et al. |

(Continued)

OTHER PUBLICATIONS

Kamble, K., U.S. Appl. No. 15/181,275, filed Jun. 13, 2016.

(Continued)

*Primary Examiner* — Lisa C Lewis
(74) *Attorney, Agent, or Firm* — Zilka-Kotab, P.C.

(57) ABSTRACT

According to one embodiment, a system includes a processing circuit and logic integrated with and/or executable by the processing circuit. The logic is configured to cause the processing circuit to determine, by an application operating on a first host in a network, one or more security features and/or capabilities available to the application for protecting the application and first data used by the application from unauthorized activity. The logic is also configured to cause the processing circuit to send, by an ADPL operating on the first host via a data socket descriptor, a first message to one or more peer applications in the network, the first message including indication of the one or more security features and/or capabilities available to the application. The logic may further cause the processing circuit to receive a second message indicating security features available to a peer application in the network operating on another host.

14 Claims, 7 Drawing Sheets

(56) References Cited

U.S. PATENT DOCUMENTS

| | | | |
|---|---|---|---|
| 9,094,407 | B1 | 7/2015 | Matthieu et al. |
| 9,338,181 | B1 | 5/2016 | Bums et al. |
| 9,349,015 | B1 | 5/2016 | Archer et al. |
| 9,491,107 | B1 | 11/2016 | Scudder et al. |
| 9,652,618 | B1* | 5/2017 | Lerner .................. G06F 21/577 |
| 9,742,768 | B2 | 8/2017 | Cholas et al. |
| 9,952,790 | B2 | 4/2018 | Kamble |
| 9,954,578 | B2 | 4/2018 | Ehrensvard |
| 10,049,211 | B1 | 8/2018 | Lukacs et al. |
| 10,129,220 | B2 | 11/2018 | Kamble |
| 10,148,697 | B2 | 12/2018 | Kamble |
| 2003/0118185 | A1 | 6/2003 | Lambert |
| 2003/0140089 | A1 | 7/2003 | Hines et al. |
| 2004/0034767 | A1 | 2/2004 | Robinson et al. |
| 2006/0020814 | A1* | 1/2006 | Lieblich ................ G06F 21/316 713/182 |
| 2006/0069912 | A1 | 3/2006 | Zheng et al. |
| 2007/0028090 | A1 | 2/2007 | Lopez et al. |
| 2007/0033642 | A1 | 2/2007 | Ganesan et al. |
| 2007/0129015 | A1* | 6/2007 | Iwamoto ............. H04L 12/2854 455/41.2 |
| 2007/0239761 | A1 | 10/2007 | Baio et al. |
| 2007/0250923 | A1 | 10/2007 | M'Raihi |
| 2008/0115203 | A1 | 5/2008 | Elzur |
| 2009/0019535 | A1 | 1/2009 | Mishra et al. |
| 2009/0172402 | A1 | 7/2009 | Tran |
| 2009/0185687 | A1 | 7/2009 | Wankmueller et al. |
| 2009/0228970 | A1 | 9/2009 | Morimoto |
| 2009/0328194 | A1 | 12/2009 | Kim et al. |
| 2010/0037295 | A1 | 2/2010 | Oh et al. |
| 2010/0228964 | A1* | 9/2010 | Booth ..................... H04L 63/16 713/151 |
| 2010/0275026 | A1 | 10/2010 | McLean |
| 2011/0173699 | A1 | 7/2011 | Figlin et al. |
| 2011/0302624 | A1 | 12/2011 | Chen et al. |
| 2011/0321172 | A1* | 12/2011 | Maeda .................... G06F 21/10 726/27 |
| 2012/0051314 | A1* | 3/2012 | Goyal .................. H04L 9/0833 370/329 |
| 2012/0096510 | A1 | 4/2012 | Bentall |
| 2012/0173875 | A1 | 7/2012 | Mahidhara et al. |
| 2012/0311614 | A1* | 12/2012 | DeAnna ................. H04L 67/10 719/328 |
| 2013/0179061 | A1* | 7/2013 | Gadh .................. B60L 11/1842 701/123 |
| 2013/0191905 | A1 | 7/2013 | Harada et al. |
| 2014/0036662 | A1 | 2/2014 | Takeshima et al. |
| 2014/0051432 | A1 | 2/2014 | Gupta et al. |
| 2014/0237545 | A1 | 8/2014 | Mylavarapu et al. |
| 2014/0380484 | A1* | 12/2014 | Choi .................... G06F 21/577 726/25 |
| 2015/0134965 | A1 | 5/2015 | Morenius et al. |
| 2015/0172153 | A1 | 6/2015 | Sharma et al. |
| 2015/0213237 | A1 | 7/2015 | Kruglick |
| 2016/0080399 | A1 | 3/2016 | Harris et al. |
| 2016/0191530 | A1 | 6/2016 | Jain et al. |
| 2016/0308904 | A1 | 10/2016 | Yoon et al. |
| 2016/0321452 | A1 | 11/2016 | Richardson et al. |
| 2016/0364163 | A1 | 12/2016 | Kamble |
| 2016/0366108 | A1 | 12/2016 | Kamble |
| 2016/0366142 | A1 | 12/2016 | Kamble |
| 2016/0366186 | A1 | 12/2016 | Kamble |
| 2016/0366187 | A1 | 12/2016 | Kamble |
| 2016/0373485 | A1 | 12/2016 | Kamble |
| 2016/0381076 | A1 | 12/2016 | Kamble et al. |
| 2017/0019388 | A1 | 1/2017 | Kamble et al. |
| 2017/0039371 | A1 | 2/2017 | Lukacs et al. |
| 2017/0053120 | A1 | 2/2017 | Kamble et al. |
| 2017/0230414 | A1 | 8/2017 | Kamble |
| 2018/0069862 | A1* | 3/2018 | Cholas .................... H04L 63/08 |
| 2018/0089429 | A1 | 3/2018 | Kamble |

OTHER PUBLICATIONS

Non-Final Office Action from U.S. Appl. No. 15/181,275, dated Dec. 8, 2017.
Younis, A., "Socket Data structures and How the TCP protocol works," CS457, Fall 2014, pp. 1-18 retrieved from http://www.cs.colostate.edu/-gersch/cs457/CS457 tutorial2.pdf.
Hall, B., "Beej's Guide to Network Programming Using Internet Sockets," May 3, 2001, pp. 1-47 retrieved from http://www.cs.columbia.edu/-danr/courses/6761 /Fall00/hw/pa1 /6761-sockhelp.pdf.
Kamble, K., U.S. Appl. No. 15/181,304, filed Jun. 13, 2016.
Notice of Allowance from U.S. Appl. No. 15/181,304, dated Dec. 15, 2017.
Kamble, K., U.S. Appl. No. 15/182,505, filed Jun. 14, 2016.
Non-Final Office Action from U.S. Appl. No. 15/182,505, dated Apr. 6, 2018.
Kamble, K., U.S. Appl. No. 15/182,544, filed Jun. 14, 2016.
Non-Final Office Action from U.S. Appl. No. 15/182,544, dated Mar. 16, 2018.
Kamble, K., U.S. Appl. No. 15/182,548, filed Jun. 14, 2016.
Non-Final Office Action from U.S. Appl. No. 15/182,548, dated Jun. 15, 2018.
Kamble, K., U.S. Appl. No. 15/184,956, filed Jun. 16, 2016.
Non-Final Office Action from U.S. Appl. No. 15/184,956, dated Mar. 30, 2018.
Kamble et al., U.S. Appl. No. 15/191,420, filed Jun. 23, 2016.
Non-Final Office Action from U.S. Appl. No. 15/191,420, dated Mar. 22, 2018.
Kamble et al., U.S. Appl. No. 15/210,828, filed Jul. 14, 2016.
Non-Final Office Action from U.S. Appl. No. 15/210,828, dated Jun. 13, 2018.
Kamble et al., U.S. Appl. No. 15/243,854, filed Aug. 22, 2016.
Kamble K., U.S. Appl. No. 15/275,239, filed Sep. 23, 2016.
Non-Final Office Action from U.S. Appl. No. 15/275,239, dated May 16, 2018.
Kamble, K., U.S. Appl. No. 15/424,749, filed Feb. 3, 2017.
Notice of Allowance from U.S. Appl. No. 15/181,275, dated Jul. 16, 2018.
Du, W., "SYN-Cookies Exploration Lab," Syracuse University, 2006, pp. 1-3.
Final Office Action from U.S. Appl. No. 15/191,420, dated Aug. 14, 2018.
Supplemental Notice of Allowance from U.S. Appl. No. 15/181,275, dated Sep. 6, 2018.
Notice of Allowance from U.S. Appl. No. 15/184,956, dated Sep. 4, 2018.
Non-Final Office Action from U.S. Appl. No. 15/424,749, dated Sep. 19, 2018.
Kar et al., "Prevention of SQL Injection Attack Using Query Transformation and Hashing," 3rd Annual IEEE International Advance Computing Conference, 2013, pp. 1317-1323.
Notice of Allowance from U.S. Appl. No. 15/182,544, dated Oct. 4, 2018.
Non-Final Office Action from U.S. Appl. No. 15/243,854, dated Oct. 5, 2018.
Supplemental Notice of Allowance from U.S. Appl. No. 15/181,275, dated Oct. 17, 2018.
Corrected Notice of Allowance from U.S. Appl. No. 15/184,956, dated Oct. 29, 2018.

* cited by examiner

APPLICATION SECURITY CAPABILITY EXCHANGE VIA THE APPLICATION AND DATA PROTECTION LAYER

FIELD OF THE INVENTION

The present invention relates to network and system protection, and more particularly, this invention relates to exchanging application security capabilities and features using an application and data protection layer (ADPL).

BACKGROUND

Applications are made up of a large number of instructions and data. Instructions operate on data which is fetched in a cache and memory and is always unencrypted. Scaled-out, distributed applications are made up of a large number of application instances. These application instances have their own data in the cache and memory of the processor on which these applications run. A large number of such application instances communicate with each other and process data in parallel to create an aggregate output.

These types of scaled-out applications are extremely vulnerable to application breaches, data thefts from cache and memory by scraping, and other methods of illicitly obtaining data from the applications, cache, and/or memory. In data centers which cater to important applications and data types, such as Personally Identifiable Information (PII), Payment Card Industry (PCI) data, medical information that falls under Health Insurance Portability and Accountability Act (HIPAA), military and Government critical tasks, any application and/or data breach is very destructive and expensive to contain and/or resolve. Therefore, it is beneficial to attempt to prevent such breaches.

SUMMARY

In one embodiment, a method includes determining, by an application operating on a first host in a network, one or more security features and/or capabilities available to the application for protecting the application and first data used by the application from unauthorized activity. The method also includes sending, by an application and data protection layer (ADPL) operating on the first host via a data socket descriptor, a first message to one or more peer applications in the network, the first message including indication of the one or more security features and/or capabilities available to the application.

According to another embodiment, a system includes a processing circuit and logic integrated with and/or executable by the processing circuit. The logic is configured to cause the processing circuit to determine, by an application operating on a first host in a network, one or more security features and/or capabilities available to the application for protecting the application and first data used by the application from unauthorized activity. The logic is also configured to cause the processing circuit to send, by an ADPL operating on the first host via a data socket descriptor, a first message to one or more peer applications in the network, the first message including indication of the one or more security features and/or capabilities available to the application.

In yet another embodiment, a computer program product includes a computer readable storage medium having program instructions stored thereon. The program instructions are executable by a processing circuit to cause the processing circuit to determine, by an application operating on a first host in a network, one or more security features and/or capabilities available to the application for protecting the application and first data used by the application from unauthorized activity. The program instructions are also executable by the processing circuit to cause the processing circuit to send, by an ADPL operating on the first host via a data socket descriptor, a first message to one or more peer applications in the network, the first message including indication of the one or more security features and/or capabilities available to the application.

The embodiments described above may be implemented in any computing system environment known in the art, such as a networking environment, which may include a processor and a computer readable storage medium configured to store data and logic, the logic being implemented with and/or executable by the processor to cause the processor to perform one or more functions.

BRIEF DESCRIPTION OF THE DRAWINGS

The following descriptions of the drawings are not meant to be limiting on what is taught by the drawings in any manner. For a fuller understanding of the content of each drawing, the following brief descriptions are provided, which when read in conjunction with the detailed description, describe the full breadth of the various embodiments of the present invention.

DETAILED DESCRIPTION

The descriptions presented herein are intended to enable any person skilled in the art to make and use the present invention and are provided in the context and requirements of particular applications of the present invention.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an," and "the" include plural referents unless otherwise specified.

Moreover, the term "about" when used herein to modify a value indicates a range that includes the value and less and greater than the value within a reasonable range. In the absence of any other indication, this reasonable range is plus and minus 10% of the value. For example, "about to milliseconds" indicates to 10 ms±1 ms, such that the range includes all values in a range including 9 ms up to and including 11 ms.

Also, the term "comprise" indicates an inclusive list of those elements specifically described without exclusion of any other elements. For example, "a list comprises red and green" indicates that the list includes, but is not limited to, red and green. Therefore, the list may also include other colors not specifically described.

Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown and described herein, but is to be accorded the widest scope consistent with the principles and features disclosed herein.

In particular, various embodiments of the invention discussed herein may be implemented using a network, such as the Internet, to communicate among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN), or other communication media. In addition, various combinations of wired (e.g., Ethernet), wireless (e.g., radio frequency) and optical communication links (e.g., fiber optic) may be utilized.

The term application as used herein refers to any type of software and/or hardware-based application, such as enterprise data center applications, Internet-of-Things (IOT) applications, Industrial control applications, military applications, etc.

Enterprise data center applications may include any of the following application types: financial applications, equity trading applications, healthcare applications, financial transaction applications, etc.

IOT applications may include any of the following application types: mobile communication applications, home automation/control applications, industrial automation/control applications, security and monitoring applications, etc.

Industrial control applications may include any of the following application types: nuclear power plant control, thermal power plant control, hydro-electric power plant control, wind farm control, electricity grid and distribution control, water treatment control, land-based traffic control, air traffic control, etc.

Military applications may include any of the following application types: military installation control, first alert system control, autoguided weapon system control, military weaponized equipment control including manned vehicles, weaponized and/or surveillance-oriented unmanned vehicle control (drones) such as unmanned aerial vehicles (UAVs), unmanned aircraft systems (UASs), unmanned underwater vehicles (UUVs), unmanned ground vehicles (UGVs), etc.

A program environment in which one embodiment may be executed illustratively incorporates one or more general-purpose computers and/or special-purpose devices, such as switches, routers, switch controllers, etc. Details of such devices (e.g., processor, memory, data storage, input devices, and output devices) are well known and are omitted for the sake of clarity.

It should also be understood that the techniques of the present invention may be implemented using a variety of technologies. For example, the methods described herein may be implemented in software running on a computer system, implemented in hardware utilizing one or more hardware processors and logic (hardware logic and/or software logic) implemented with and/or executable by the hardware processor. The logic is configured to cause the processor to perform operations of a method, and may take any form known to those of skill in the art, such as application specific integrated circuits (ASICs), programmable logic devices such as Field Programmable Gate Arrays (FPGAs), and/or various combinations thereof.

In one illustrative approach, methods described herein may be implemented by a series of computer-executable instructions stored to a computer readable storage medium, such as a physical (e.g., non-transitory) data storage medium. In addition, although specific embodiments may employ object-oriented software programming concepts, the present invention is not so limited and is adaptable to employ other forms of directing the operation of a processor.

The present invention may also be provided in the form of a computer program product comprising a computer readable storage medium having program instructions thereon or a computer readable signal medium having program instructions therein, which may be executed by a computing device (e.g., a processor) and/or a system. A computer readable storage medium may include any medium capable of storing program instructions thereon for use by a computing device or system, including optical media such as read only and writeable CDs and DVDs, magnetic memory or media (e.g., hard disk drive, magnetic tape, etc.), semiconductor memory (e.g., FLASH memory, non-volatile random access memory (NVRAM), and other non-volatile storage media known in the art), firmware encoded in a microprocessor, etc.

A computer readable signal medium is one that does not fit within the aforementioned computer readable storage medium definitions. For example, illustrative computer readable signal media communicate or otherwise transfer transitory signals within a system, between systems, etc., e.g., via a physical or virtual network having a plurality of connections.

Figure 1:
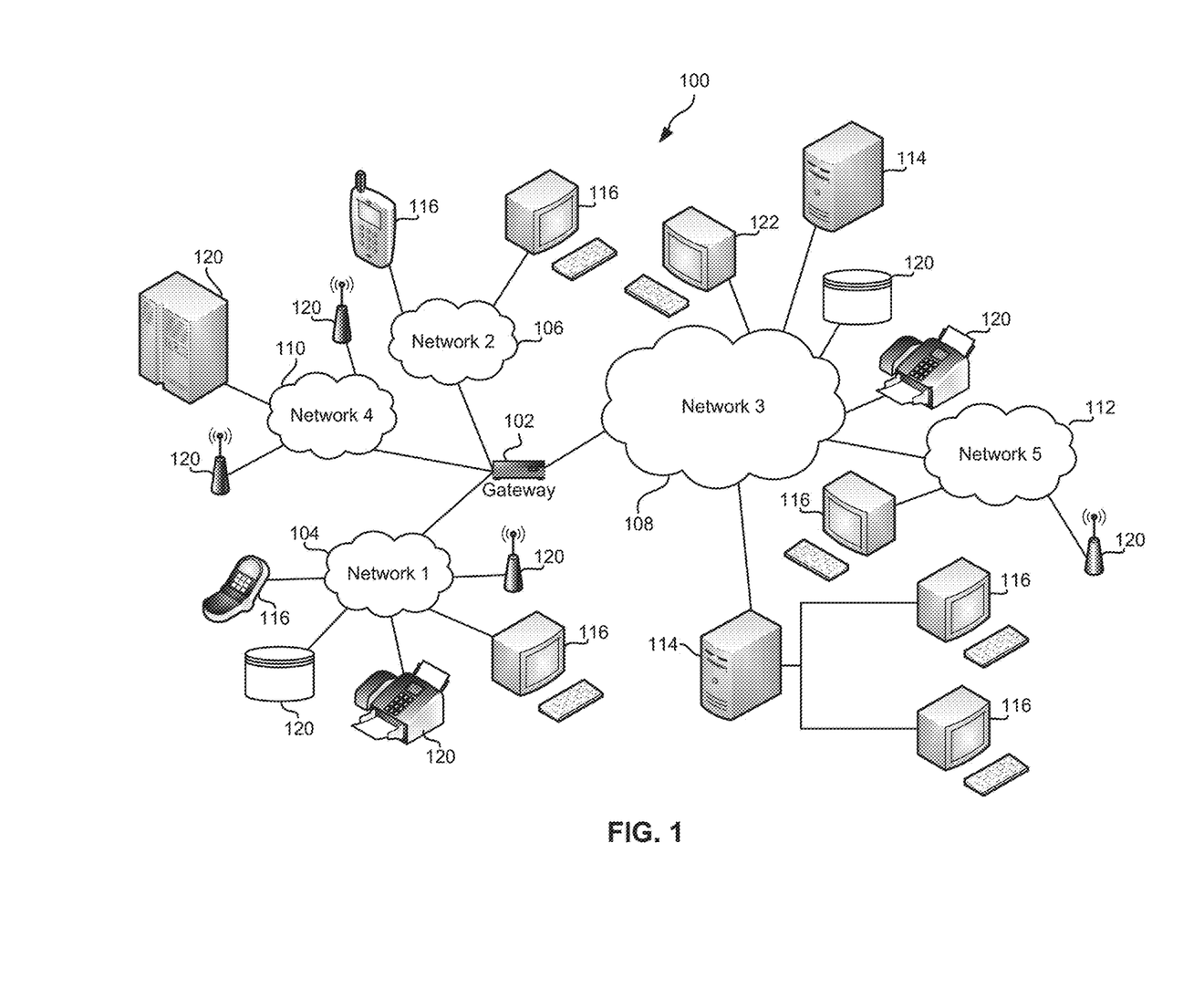
FIG. 1 shows a network architecture, according to one embodiment.

FIG. 1 illustrates an architecture 100, in accordance with one embodiment. As an option, the present architecture too may be implemented in conjunction with features from any other embodiment listed herein, such as those described with reference to the other figures. Of course, however, such architecture 100 and others presented herein may be used in various applications and/or in permutations which may or may not be specifically described in the illustrative embodiments listed herein. Further, the architecture too presented herein may be used in any desired environment.

As shown in FIG. 1, a plurality of remote networks are provided including a first remote network 104 and a second remote network 106. A gateway 102 may be coupled between the remote networks 104, 106 and a proximate network 108. In the context of the present network architecture 100, the networks 104, 106 may each take any form including, but not limited to, a LAN, a WAN such as the Internet, a storage area network (SAN), a public switched telephone network (PSTN), an internal telephone network, etc. Additional networks 110, 112 may also be connected via the gateway 102 or some other connection device known in the art. These networks may be of a different type than the networks 104, 106. For example, network 110 may be a network devoted to the IOT, and may provide infrastructure and protocols for communication between all devices in the IOT, and between any devices in the IOT and the networks 104, 106. In another example, network 112 may be a network devoted to Industrial control, and may provide infrastructure and protocols for communication within and/or between facilities anywhere in the world, including automated devices, manufacturing lines, assembly lines, processing control software, etc.

In use, the gateway 102 serves as an entrance point from the remote networks 104, 106 to the proximate network 108. As such, the gateway 102 may function as a router, which is capable of directing a given packet of data that arrives at the gateway 102, and a switch, which furnishes the actual path in and out of the gateway 102 for a given packet.

Further included in the network architecture 100 is at least one data server 114 coupled to the proximate network 108, and which is accessible from the remote networks 104, 106 via the gateway 102. It should be noted that the data server(s) 114 may include any type of computing device/groupware. Coupled to each data server 114 is a plurality of user devices 116. User devices 116 may include any device known by those of skill in the art, such as a desktop computer, a laptop computer, a hand-held computer, a smartphone, a terminal, a port, a printer, some type or form of logic, etc. It should be noted that a user device 122 may also be directly coupled to any of the networks, in one embodiment.

A peripheral 120 or series of peripherals 120, e.g., facsimile machines, printers, networked storage units, hard disk drives, wireless routers, etc., may be coupled to one or more of the networks 104, 106, 108, 110, 112. It should be noted that databases, servers, mainframes, and/or additional components may be utilized with and/or integrated into any type of network element coupled to the networks 104, 106, 108, 110, 112. In the context of the present descriptions, a network element may refer to any component of a network, system, device, and/or any device useable in a network.

According to some approaches, methods and systems described herein may be implemented with and/or utilized on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of virtualization software, such as VMWARE ESX, MICROSOFT HYPER-V, SIMICS, etc., in some embodiments.

In more approaches, one or more of the networks 104, 106, 108, 110, 112 may represent a cluster of systems commonly referred to as a "cloud." In cloud computing, shared resources, such as processing power, peripherals, software, data processing, servers, storage, etc., are provided to any system that has access to the cloud and permission to access the specific resource, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used as would be understood by those of skill in the art.

Figure 2:
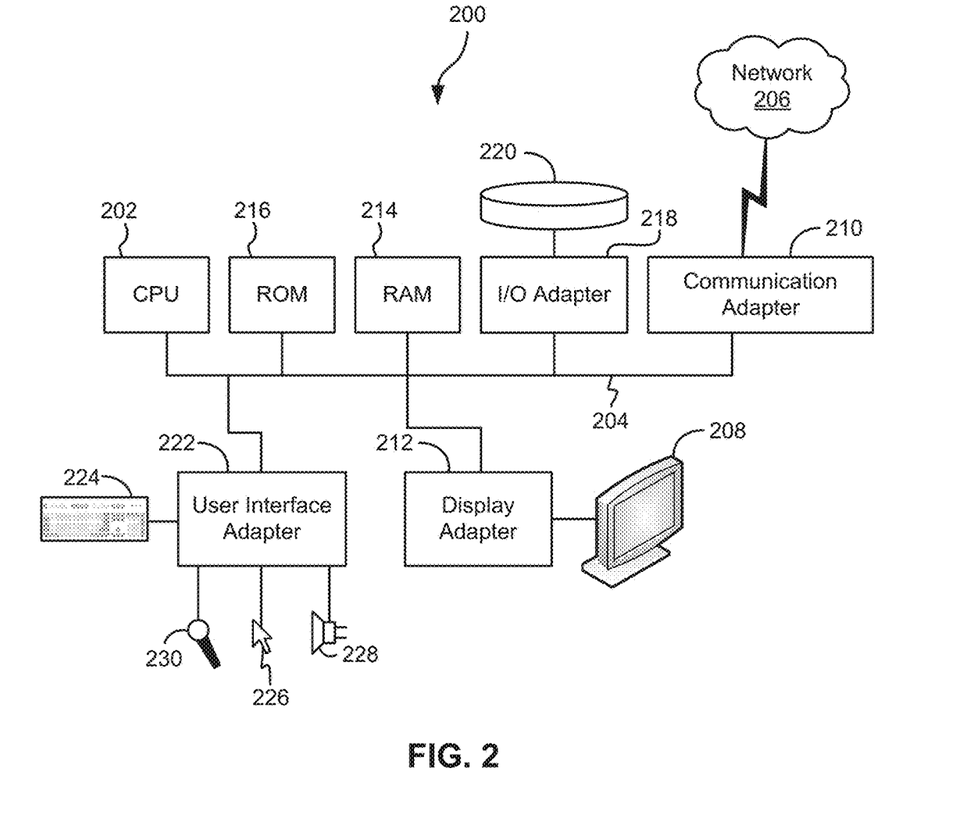
FIG. 2 shows a hardware environment that may be associated with the network architecture of FIG. 1, according to one embodiment.

FIG. 2 shows a representative hardware environment associated with a user device 116 and/or a server 114 of FIG. 1, in accordance with one embodiment. FIG. 2 illustrates a typical hardware configuration of a workstation 200 having a central processing unit 202, such as a microprocessor, and a number of other units interconnected via a system bus 204.

The workstation 200 shown in FIG. 2 includes a Random Access Memory (RAM) 214, Read Only Memory (ROM) 216, an I/O adapter 218 configured to connect peripheral devices, such as disk storage units 220 to the bus 204, a user interface adapter 222 configured to connect a keyboard 224, a mouse 226, a speaker 228, a microphone 230, and/or other user interface devices such as a touch screen, a digital camera, etc., (not shown) to the bus 204, communication adapter 210 configured to connect the workstation 200 to a communication network 206 (e.g., a data processing network) and a display adapter 212 configured to connect the bus 204 to a display device 208.

The workstation 200 may have resident thereon an operating system, such as the MICROSOFT WINDOWS Operating System (OS), a MAC OS, a UNIX OS, etc. It will be appreciated that a preferred embodiment may also be implemented on platforms and operating systems other than those specifically mentioned herein. A preferred embodiment may be written using JAVA, XML, C, and/or C++ language, SCALA, COBOL, FORTRAN, or other programming languages, along with an object oriented programming methodology or scripting language such as PERL, PYTHON, Tcl/Tk, or other scripting languages. Object oriented programming (OOP), which has become increasingly used to develop complex applications, may also be used.

Moreover, one or more hardware processors may be implemented in a processing circuit in the workstation 200. The processing circuit includes the one or more hardware processors, along with any connections or links therebetween necessary to interconnect the one or more processors in the processing circuit. In addition, the processing circuit may be implemented with logic and/or may be configured to execute logic, with the logic being configured to cause the processing circuit to perform functionality specified by the logic.

Figure 3:
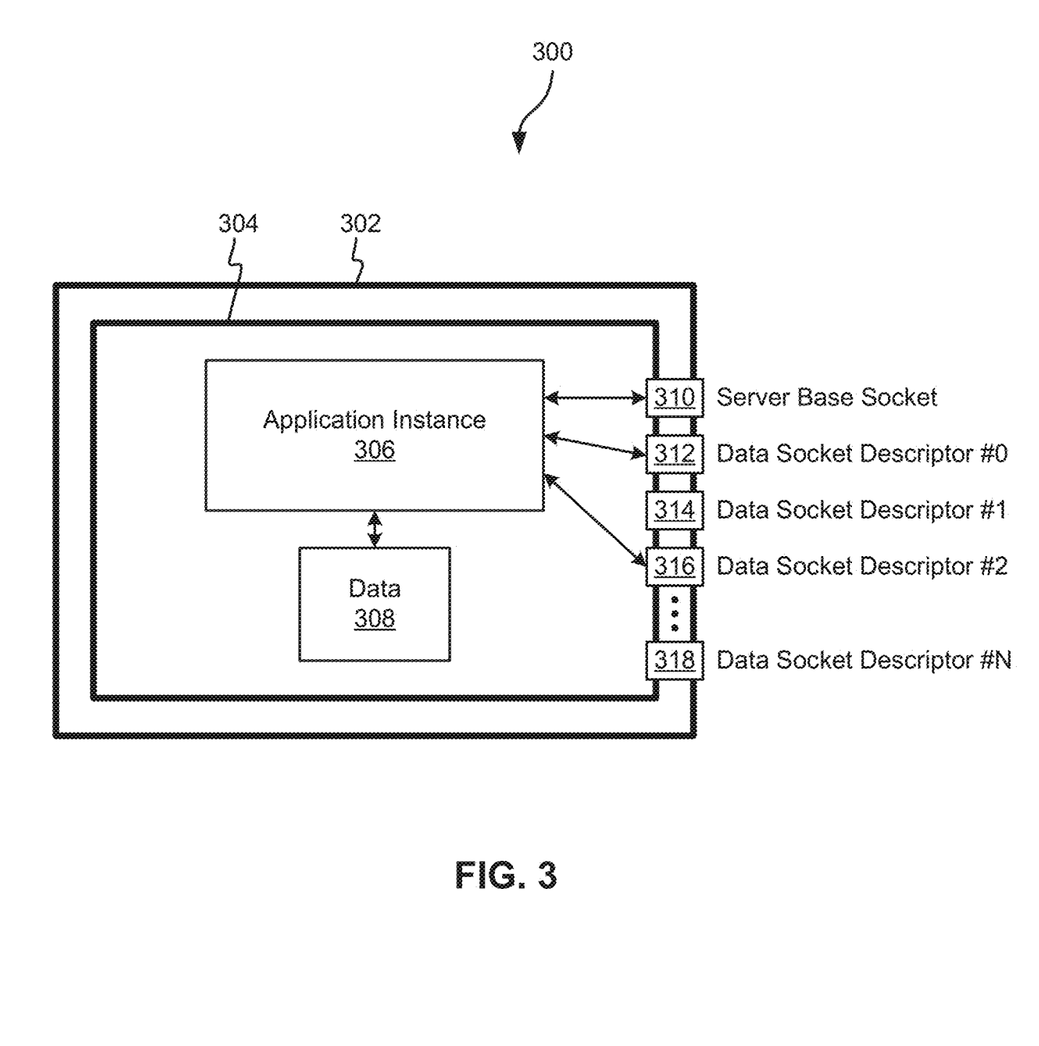
FIG. 3 shows a logical representation of an application instance operating on a computing system, in accordance with one embodiment.

Now referring to FIG. 3, a logical representation of an application instance 306 operating on a computing system 300 is shown according to one embodiment. Although only one application instance 306 and one set of data 308 is shown in FIG. 3, as would be understood by one of skill in the art, any number of application instances and groups of data may be hosted on a computing system 300, limited only by the processing power and/or other resources available to the computing system 300.

As shown in FIG. 3, an application protection layer (APL) 302 and a data protection layer (DPL) 304 are represented within the computing system 300, according to one embodiment. The application instance 306 has access to data 308 within the computing system 300. Also, the application instance 306, through any number of standard and/or custom APIs, may utilize any of a plurality of data socket descriptors (e.g., data socket descriptor #0 312, data socket descriptor #1 314, data socket descriptor #2 316, . . . , data socket descriptor #N 318) with which to communicate (send and/or receive) information outside of the application instance 306 or computing system 300. One or more server base sockets 310 is provided in the application instance 306 of computing system 300 and is used for control of the peer application instances on the computing system 300, outside the system, or outside the application instance 306 itself, as would be understood by one of skill in the art.

Many, but not all, scaled-out enterprise applications, such as those used in the fields of finance, banking, stock market investing, monetary analytics, web traffic analytics, data analytics, web searching, etc., have built-in capabilities that allow an individual instance of a scaled-out distributed application to protect itself from malicious software and data breaches. Many of the operating systems on which these scaled-out enterprise applications operate also have capabilities to protect themselves from external denial of service attacks, application vulnerability attacks, data stealing malware attacks, etc. The individual applications and operating systems perform these security capabilities using multiple built-in techniques, some of which are discussed below. For example, most database systems have the following capabilities:
1. Policy-based data redaction
2. Programmable cache flushing
3. Memory protection or locking
4. Database locking (including locking one or more individual rows and/or columns of a database)
5. Secure Socket Layer (SSL) capabilities to encrypt transport payload(s)
6. Partial application-payload encryption
7. Distributed denial of service (DDoS) checks
8. Protocol anomaly checks
9. Other standard and proprietary protections not listed above Although, these features partially protect an individual application instance or database, they fail to protect the complete distributed application system as a scaled out and/or distributed application. Various parts or portions of the application have differing capabilities to protect themselves. When the applications in a data center or enterprise are allowed to exchange their own capabilities of protection with each other using secure exchange information, the complete application ecosystem would be allowed to take advantage of the individual application's capabilities and enable a correct or most appropriate response decision about the systemic and session level security issues facing one or more distributed application instances.

In order to provide application and data protection to application instances of distributed, scaled-out applications which have instances operating on a plurality of computing systems, at least two operations may be performed, and are described below according to one embodiment.

In a first operation, application instances, such as application instance 306, are identified based upon data socket descriptor attributes that an application instance uses to communicate between other application instances and/or group(s) of application instances on/or outside of the computing system 300. For example, in response to application instance 306 utilizing data socket descriptor #0 312 consistently to communicate with another system, an association may be established between data socket descriptor #0 312 and the application instance 306. By consistently, what is meant is that application instance 306 utilizes data socket descriptor #0 312 to communicate with another system more than a predetermined number of times within a given period of time, according to one embodiment. In another embodiment, consistently utilizing a data socket descriptor means that only a specific data socket descriptor is used in exclusion of all others over a given period of time.

In a second operation, a group is formed which includes any application instance which has all of the same socket descriptor attributes (or at least a predetermined amount of the same socket descriptor attributes, or the same of a certain group of socket descriptor attributes), e.g., data exchange sockets of the same application base socket, transport protocol, server port, various multi-tenancy characteristics, storage characteristics, payload sizes, container attributes, and/or multiple time contexts are grouped together.

Any socket descriptor attributes may be considered when determining whether an application instance shares data socket descriptor attributes with another application instance, such as OS and container attributes which include server port, transport protocol, network address translation (NAT) IP address range, maximum transmission unit (MTU), application payload sizes, user programmable attributes such as multi-tenancy labels etc.

Using the above two operations, two layers of protection (application protection and data protection) are enacted together to protect the application (not shown) from which the application instance 306 is provided and any group of application instances related to the application that provides the application instance 306.

FIG. 3 shows the Application and Data Protection Layer (ADPL) libraries which keep track of the server base socket 310 and various data socket descriptors 312, 314, 316, . . . , 318 opened by an application instance 306 for communication of data with one or more peer applications outside of the computing system 300. The data socket descriptors 312, 314, 316, . . . , 318 are used for the exchange of data with another system outside of the computing system 300.

The data socket descriptors 312, 314, 316, . . . , 318 are numbers that represent attributes and/or characteristics of different data exchanges between the application instance and one or more receiver hosts. Each data socket descriptors 312, 314, 316, . . . , 318 may have a size ranging from 12 to 48 bits, such as 32 bits in one embodiment.

Each of the Application Protection Layer (APL) 302 and the Data Protection Layer (DPL) 304 utilize individual sets of application programming interfaces (APIs) that are configured to piggyback on existing APIs, but add specialized functionality to any action performed using the existing APIs.

These new socket APIs and data protection APIs, and the type of application payload sent and received, do not disturb the intermediate security appliances such as firewall, Intrusion Prevention and Intrusion Detection, etc.

The application instance 306 utilizes the one or more server base socket(s) 310 with standard and/or private well-known port number(s) as a control socket, but opens a new data socket descriptor and allocates a different port number to the new data socket descriptor in order to handle actual functionality and data transfer between the computing system 300 and any other external or peer system.

The server base socket 310 has the following attributes and/or characteristics:
10. A server and/or a source internet protocol (IP) interface.
11. A standard and/or known server port number, e.g., transmission control protocol (TCP) port, user datagram protocol (UDP) port, etc.
12. A maximum number of allowable waiting connections.
13. A maximum (and possibly minimum) application packet buffer size usable for transmitting and receiving data.
14. Other socket options provided by the operating system, the user, or an external input.

The above described attributes and/or characteristics may also be attributed to the plurality of allocated data socket descriptors 312, 314, 316, . . . , 318. When a connection is established between the computing system 300 and another system via the application instance 306, a data socket descriptor is allocated. The allocated data socket descriptor has the following attributes and/or characteristics:
1. A server and/or a source IP interface.
2. A standard and/or known server port number, e.g., TCP port, UDP port, etc.
3. A maximum number of allowable waiting connections.
4. Application packet buffer size for transmit and receive.
5. A port number of the transport of the allocated data socket descriptor (in the computing system 300).

6. An IP address of the peer data socket descriptor (in an external system) of the allocated data socket descriptor (usually, but not always, in TCP sockets).
7. A port number of the transport of the peer data socket descriptor of the allocated data socket descriptor in all cases of controlled port allocations by the application instance 306.
8. A maximum (and possibly minimum) application packet buffer size usable for transmitting data to and receiving data from (transmissions with) the peer data socket descriptor.

Apart from the above described characteristics and/or attributes, additional characteristics that may be attributable to an allocated data socket descriptor include:

9. A first identifier (ID1): a globally unique identification number given for an entity (such as an enterprise, company, university, city subdivision, etc.) that utilizes the ADPL mechanism in the application instances or programmed for proprietary purposes
10. A second ID (ID2): a unique identification number within the entity (not necessarily globally unique). Each ID2 represents a subdivision within the entity, such as an individual business unit within an enterprise, a water district within a city, etc., or programmed for proprietary purposes.
11. Secure base signature: a base signature or scrambled alphanumeric or numerical code used in the generation of signatures per data socket descriptor.
12. Secure runtime signature: a scrambled alphanumeric or numerical code used as a signature on a per data socket descriptor basis.
13. Application name: a name given to the application instance operating on the computing system.
14. Application ID: an identification number provided to the application instance operating on the computing system.
15. Process ID: an identification number provided to a particular process which is accountable for the data.
16. Server port: the particular port on the server on which data is received or sent.
17. Transport protocol: the particular transport protocol used to send data.
18. Base Crypto Version: the version of the cryptographic process used to encrypt data.
19. Co-Lo Need: Co-locationing criteria where applications or application instances may reside together in the same server, server pool, rack, pod, or data center.
20. Architecture Tier: a tier within the system architecture on which the (web, application, database, etc.) operates.
21. Storage Attachments: an attribute that describes how the storage is attached to the computing system (e.g., direct, network, distributed, etc.)
22. Proprietary Multi-Tenant Label: a label within the ADPL tag which designates some information selectable by the user.

These unique attributes when combined together in one of many different variations, are able to identify a data socket descriptor, and locks that data socket descriptor to one particular instance of a scaled-out application group.

Highly scaled-out and distributed enterprise applications typically run on physical servers with about 2 TB of DRAM and 32 MB of cache, or more. When access to a database is requested, the whole database in un-encrypted form is fetched into the memory (in-memory) and held in clear-text for processing. This mechanism is referred to as "in-memory database." In-memory database processing provides a performance boost of almost 200 times over conventional processing which relies on fetching database records from disk storage to memory. In-memory database processing also involves processing whole rows or columns of data in cache. Although, these types of enterprise application architectures provide very high performance and scalability, they suffer from application and data security challenges. These applications exchange huge amounts of data in an East-West (E-W) manner with instances of the application. A huge amount of E-W communication and a huge amount of data in memory and cache causes these application instances to be prime targets for data breaches and/or application breaches.

Usually, application security is attempted by applying policies and rules at various levels in security appliances and/or load balancing appliances in data centers. However, in spite of providing layers of security appliances to create a security perimeter, polymorphic malware and malicious software is able to enter inside the servers in the data center to steal data and attack applications. Enterprise database applications for financial companies, such as banks, insurance companies, and credit card companies, are extremely vulnerable to data theft by various methods and various types of attacks, including spoofing, cache scraping, memory scraping, etc. Spoofing occurs when malicious code mimics real application transmission in order to obtain data that it is not authorized to obtain. Cache scraping occurs when malicious code searches the cache for data that may be sensitive in nature and copies the data or strips some or all of the data from the cache so that it may be utilized by inappropriate entities. Memory scraping is similar, except that the memory may hold large amounts of application data as well as the in-memory database which receives attacks for data stored therein.

Many databases provide features that may be used to address these forms of attack. One such feature, referred to as run-time results-cache flush, is used to flush the cache (e.g., discard all data in the cache) according to some static schedule or in response to performance issues. One problem with this approach is that the cache flush is performed, typically, to achieve performance enhancements instead of protecting data. A cache flush may be performed in this approach at times when new data needs to be processed by fetching it from the memory.

Another feature is data redaction, in which sensitive data may be redacted and/or masked from transmissions according to a static policy, which typically indicates that all data that conforms to a certain type is redacted from transmissions. One problem with this approach is that the redaction policies are statically applied depending upon the access levels of the client who is seeking the data and do not redact data if the query owner has administrative credentials.

Yet another feature is locking of in-memory database(s). In this feature, an entire database table is locked, or specific row(s) or column(s) of the database table are locked. The database locking may be programmatically applied to avoid un-authorized access to the database(s). The problem with the current implementation of this feature is that the database locking is typically performed according to some static policy. Most of the times, the in-memory database(s) are locked without understanding the security situation in which the application(s) must deal with. A vast majority of the time, the database locking mechanism is not used at all since it creates functional and performance issues, and therefore is not a preferred approach in current implementations.

With scaled-out database applications, clustered databases, and/or distributed database applications, the application servers or database servers are scattered all over the data center. Huge amounts of data is exchanged between these application instances over the networks, which are intended to be highly protected from outside entities. However, in reality, most of the datacenter breaches occur from within the datacenter. The various application instances operating within the datacenter are not aware of their surroundings, not aware of a security status of the physical servers they are running on, and not aware of the security status of peer application instances they are sharing data with. The security status refers to a security profile or malware infection level of the hosts. Almost all of the datacenter applications share data with each other without knowing the security profiles of each other, thereby leading to data breaches or data stealing by malware and malicious code using server application vulnerabilities.

Therefore, according to embodiments described herein, application data may be secured via one or more security features described herein depending upon the dynamic security profiling of the surroundings of the application instance on a per-data socket descriptor basis.

In one embodiment described herein, a cache holding sensitive information, such as Personally Identifiable Information (PII), Payment Card Industry (PCI) data, Health Insurance Portability and Accountability Act (HIPPA) sensitive data, business-critical data, or some other data for which it is undesirable for unauthorized entities to obtain, may be programmatically and dynamically flushed to avoid cache scraping or stealing data from cache using already existing application architecture, along with the ADPL Business-critical data may comprise any data that is deemed to be important by an administrator, such as trade secrets, proprietary algorithms and formulae, details of secret projects, names of hidden employees, etc.

In accordance with another embodiment, PII, PCI, HIPPA sensitive data, business-critical data, and other sensitive information may be redacted and/or masked prior to sending out a payload via data socket descriptor-based dynamic policies. The redaction may be performed in full, partially, via regular expression, or via random expression, as will be described in more detail herein.

In accordance with yet another embodiment, PII, PCI, HIPPA sensitive data, business-critical data, and other sensitive information may be protected using dynamic locking of in-memory database(s). In this feature, one or more in-memory database tables is locked, or specific row(s) and/or column(s) of at least one of the database tables are locked, in response to a threat or risk ascertained according to a received security profile.

According to another embodiment, PII, PCI, HIPPA sensitive data, business-critical data, and other sensitive information may be protected using dynamic payload encryption, in which some or all of a payload in a transmission via a data socket descriptor may be dynamically encrypted based on a threat or risk ascertained by security profile exchange between the application instances using the data socket. In another embodiment, certain data within one or more in-memory database tables may be encrypted using any known encryption techniques known in the art.

With these new approaches, application instances operating on hosts or servers are provided the tools to protect themselves and their own data from malware attacks, scraping, spoofing, etc. This method works by overloading standard and/or proprietary APIs including socket APIs and/or libraries and provides protection to application instances and their data. Furthermore, the approach does not interfere with the application architecture and its normal behavior.

Through these new APIs, application instances are provided extra capabilities to get additional infrastructural help to know the security status of virtual and/or physical servers running the application instances, the security status of other peer applications and their virtual and/or physical servers, details of types of attacks that have occurred on the peer application instances, a number of times each of the peer application instance have thwarted breach attempts, etc. Based on the comprehensive status of servers and the network, the APIs provide feedback on a per-socket descriptor basis to the application instances. Moreover, the APIs may suggest the use of specific data protection mechanisms to protect clear data being exchanged with peers or clients.

Figure 4:
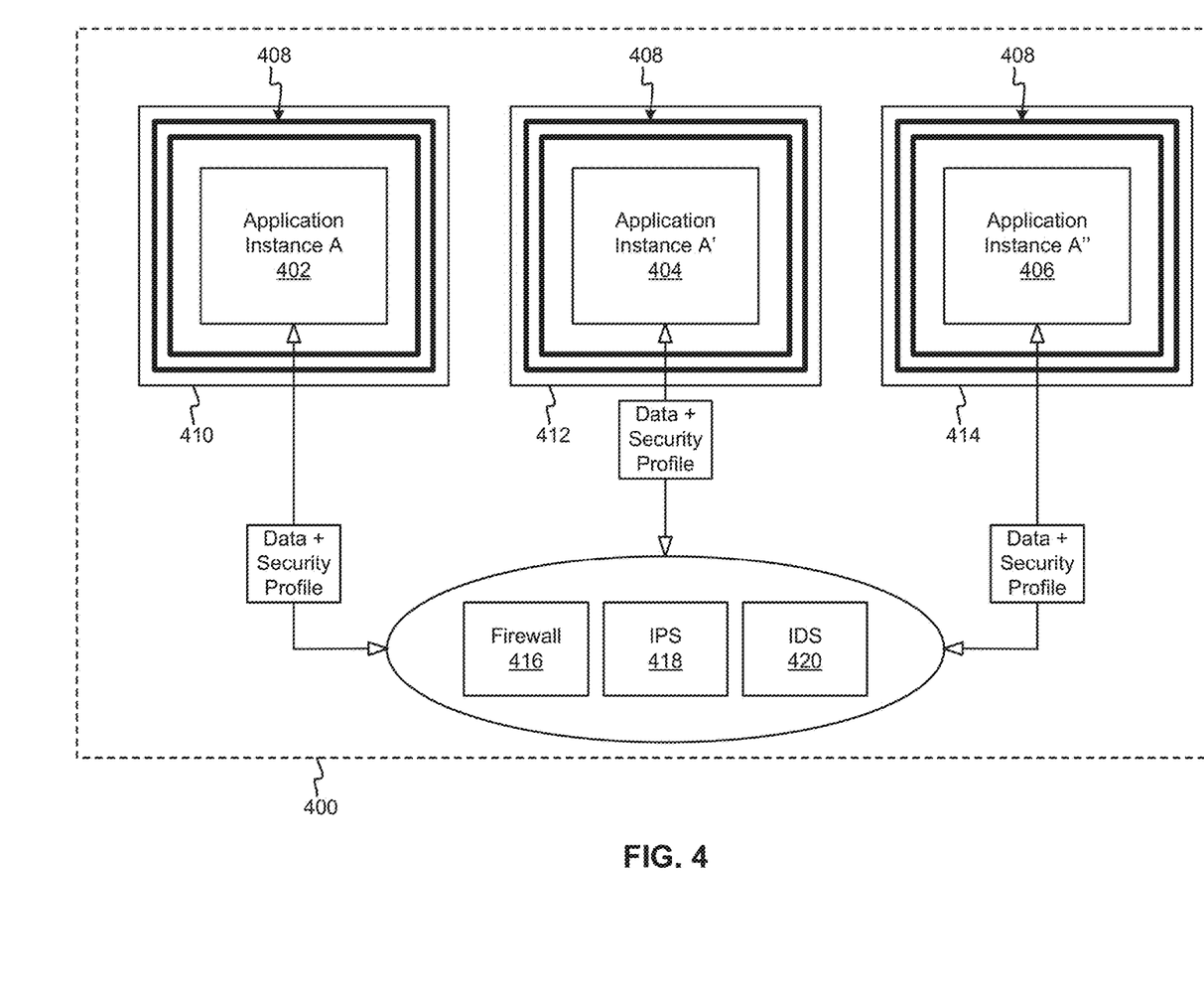
FIG. 4 shows several application instances operating in a virtual environment, according to one embodiment.

Now referring to FIG. 4, three instances of an application, Application instance A 402, Application instance A' 404, and Application instance A" 406 are shown running in a virtual environment 400 on one or more virtual platforms, such as hypervisors. An ADPL 408 provided by secure APIs called by the hosts, Host A 410, Host A' 412, and Host A" 414, enables application protection via policies and also provides data protection by sharing a security status and security profile with any peer application instances operating on other hosts (Application instance A 402 is a peer to Application instance A' 404, Application instance A' 404 is a peer to Application instance A" 406, Application instance A" 406 is a peer to Application instance A 402, and so forth). Using the security profile of the peer application instance, the protected application instance is provided the capability to apply various data security mechanisms to protect itself from malicious code and data breach attacks.

New data socket APIs and data protection APIs that are utilized to provide the protection do not disturb any intermediate security appliances used in the network and/or on the servers or hosts, such as a firewall 416, an Intrusion Prevention System (IPS) 418, an Intrusion Detection System (IDS) 420, etc.

The new data socket APIs and/or libraries are used to exchange information regarding an application or application instance's (e.g., application instance 402, 404, 406, etc.) own security capabilities with other peer applications and application instances (e.g., application instance 402, 404, 406, etc.), as well as to exchange and/or provide information regarding the application or application instance's (e.g., application instance 402, 404, 406, etc.) own security capabilities to one or more various security devices, security appliances, etc. (e.g., firewall 416, IPS 418, IDS 420, etc.), that may be operating within a network or data center (e.g., virtual environment 400).

Through similar APIs, applications and application instances (e.g., application instance 402, 404, 406, etc.) receive security capabilities and interpret these received security capabilities from other peer applications and application instances (e.g., application instance 402, 404, 406, etc.) to understand what sort of security each peer application and application instance (e.g., application instance 402, 404, 406, etc.) is capable of. This process does not interfere with the application architecture and its normal behavior. Through this exchange process, each application and application instance (e.g., application instance 402, 404, 406, etc.) is afforded additional capabilities for infrastructural help and to know the security capabilities of virtual and/or physical servers (e.g., Host A 410, Host A' 412, Host A" 414, etc.) that execute the applications and application instances (e.g., application instance 402, 404, 406, etc.) within the network and/or data center, the security capabilities of other peer applications and application instances (e.g., application instance 402, 404, 406, etc.) and their virtual and/or physical servers, etc. Moreover, the ADPL which protect the applications and application instances (e.g., application instance 402, 404, 406, etc.) by protecting the data socket descriptors may also receive the applications' and application instances' capabilities and in return, utilize these capabilities to cause applications and application instances (e.g., application instance 402, 404, 406, etc.) to use these capabilities dynamically depending upon security profiles of individual sessions.

The security profiles of individual sessions are obtained by the ADPL 408 using its built-in capability for distributed applications. Based on the comprehensive status of servers and the network, the APIs provide feedback per data socket descriptor to the applications and application instances (e.g., application instance 402, 404, 406, etc.) and also suggests use of their own security capabilities to protect themselves as well as to clear data being exchanged with peers or clients.

The ADPL 408 around the socket descriptors for database applications creates a mapping of security profile policies with the application per data socket descriptor to perform various security feature functionality, such as dynamic cache flush, dynamic data redaction, locking of in-memory database(s), etc. These security features are configured to be applied on a per application instance per session basis. As a result, a database server is allowed to enact a dynamic security feature depending upon the security profile of that particular session at that time, thereby avoiding cache scraping, data breaches, or other unwanted intrusion by malware or nefarious applications.

Figure 5:
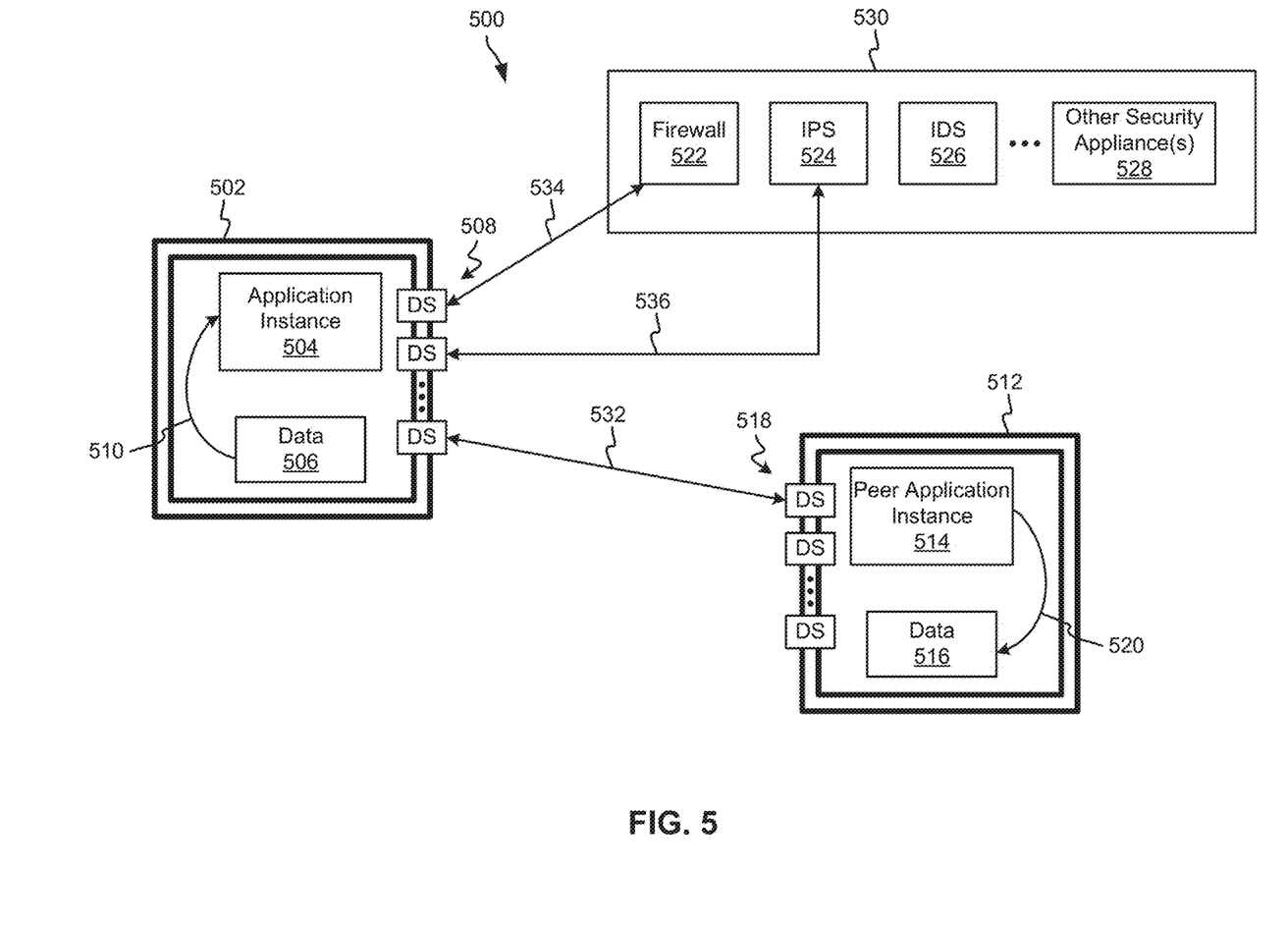
FIG. 5 shows an exchange of capabilities with intermediate devices and peer applications, according to one embodiment.

FIG. 5 shows exchange of security capabilities with intermediate device(s) 530 and peer application(s) and application instance(s) 514 in a network 500, according to one embodiment. This exchange may take place in accordance with what is referred to as Security Capabilities Exchange Protocol (SCEP) in one approach.

At application boot up or start time (or some other time shortly after the application instance 504 has begun operating on its host or server), the application instance 504 calls one or more ADPL APIs provided by the ADPL 502 that enable the application instance 504 to inform the ADPL 502 about security capabilities and/or features that are installed and/or accessible to the application instance 504. This information may be exchanged with the ADPL 502 via a protocol data unit (PDU) that is configured to transmit such information, in one embodiment.

In one embodiment, the application instance 504 (and any other application or application instance operating in the network 500) may be configured to access data 506 that is stored for the application instance 504, shown as access operation 510. This operation 510 takes place using conventional APIs and/or routine functionality of the application instance 504, except that any access of the data 506 is protected by the ADPL 502 through API extensions and/or ADPL APIs that piggyback on the conventional APIs used to access the data 506.

Moreover, according to one embodiment, the ADPL 502 protecting the application instance 504 (and any other ADPL protecting an application or application instance operating in the network 500) may be configured to exchange security capability information via one or more data socket descriptors 508 with one or more peer application(s) and/or application instance(s) (shown as peer application instance 514 in FIG. 5, but any number of peer applications and/or application instances may have security capabilities exchanged therewith) via one or more data socket descriptors 518 of the peer application instance 514. The security capabilities are exchanged via the ADPL 502 protecting the application instance 504 that exchanges (sends and/or receives) the security capabilities with an ADPL 512 protecting the peer application instance 514 in exchange operation 532. This exchange 532 may take place during a connection setup process for transmission control protocol (TCP) or before the data exchange for user datagram protocol (UDP) in some approaches, or at some other convenient time. In this way, the ADPL 502 utilizes data socket APIs to exchange security capabilities and/or features of the local application instance 504 with one or more peer application(s) and application instance(s) (e.g., peer application instance 514) operating in the network 500.

For unicast sessions, the capabilities are exchanged per application per server basis in one approach. For multicast sessions, the capabilities are optionally sent over open UDP data sockets in another approach.

Thereafter, the peer application instance 514, upon receiving the security capabilities and/or features of application instance 504 is configured to build a table of security capabilities for each peer application (per host) in the network 500. Moreover, the application instance 504, upon receiving security capabilities and/or features of peer application instance 514 is configured to build a table of security capabilities for each peer application (per host) in the network 500. This allows all peer application(s) and application instance(s) in the network 500 to realize and store the security capabilities and features of all peer applications and application instances in the network 500, so that such functionality may be leveraged in future operations that may be aided by the use of a peer application's security capabilities.

The decision of whether to use security capabilities and/or features of a peer application (e.g., peer application instance 514) in a transmission to/from the peer application and local application (e.g., application instance 504) may be based on a security profile of either the peer application instance 514 and/or the application instance 504 active in the transmission.

Moreover, application instance 504, via one or more APDL APIs, is configured to cause the peer application instance 514 to apply one or more security capabilities and/or features to a corresponding session designated with a data socket descriptor between the application instance 504 and the peer application instance 514.

Any modifications, additions, and/or deletions of security capabilities and/or features on an application or application instance within the network 500 is relayed to all other peer applications and/or application instances via one or more existent sessions between peer applications and/or new sessions established to relay this updated information.

Also, in one embodiment, the peer application instance 514 (and any other application or application instance operating in the network 500) may be configured to store data 516 for the peer application instance 514, shown as store operation 520. This operation 520 takes place using conventional APIs and/or routine functionality of the peer application instance 514, except that storage of the data 516 is protected by the ADPL 512 through API extensions and/or ADPL APIs that piggyback on the conventional APIs used to store the data 516.

In another embodiment, the ADPL 502 protecting the application instance 504 (and any other ADPL protecting an application or application instance operating in the network 500) may be configured to exchange security capability information via one or more data socket descriptors 508 with one or more intermediate devices 530 (such as a firewall appliance 522, an IPS 524 an IPS 524, an IDS 526, other security appliances 528, etc.) in the network 500. For example, in FIG. 5, the ADPL 502 protecting the application instance 504 exchanges (sends and/or receives) security capabilities with a firewall appliance 522 in exchange operation 534 and exchanges (sends and/or receives) security capabilities with an IPS 524 in exchange operation 536.

Thereafter, the one or more intermediate devices 530, upon receiving the security capabilities and/or features of application instance 504, are configured to build a table of security capabilities per session (based on the data socket descriptor used to exchange the security capabilities and/or features of application instance 504) and per application (e.g., application instance 504) in the network 500.

Figure 6:
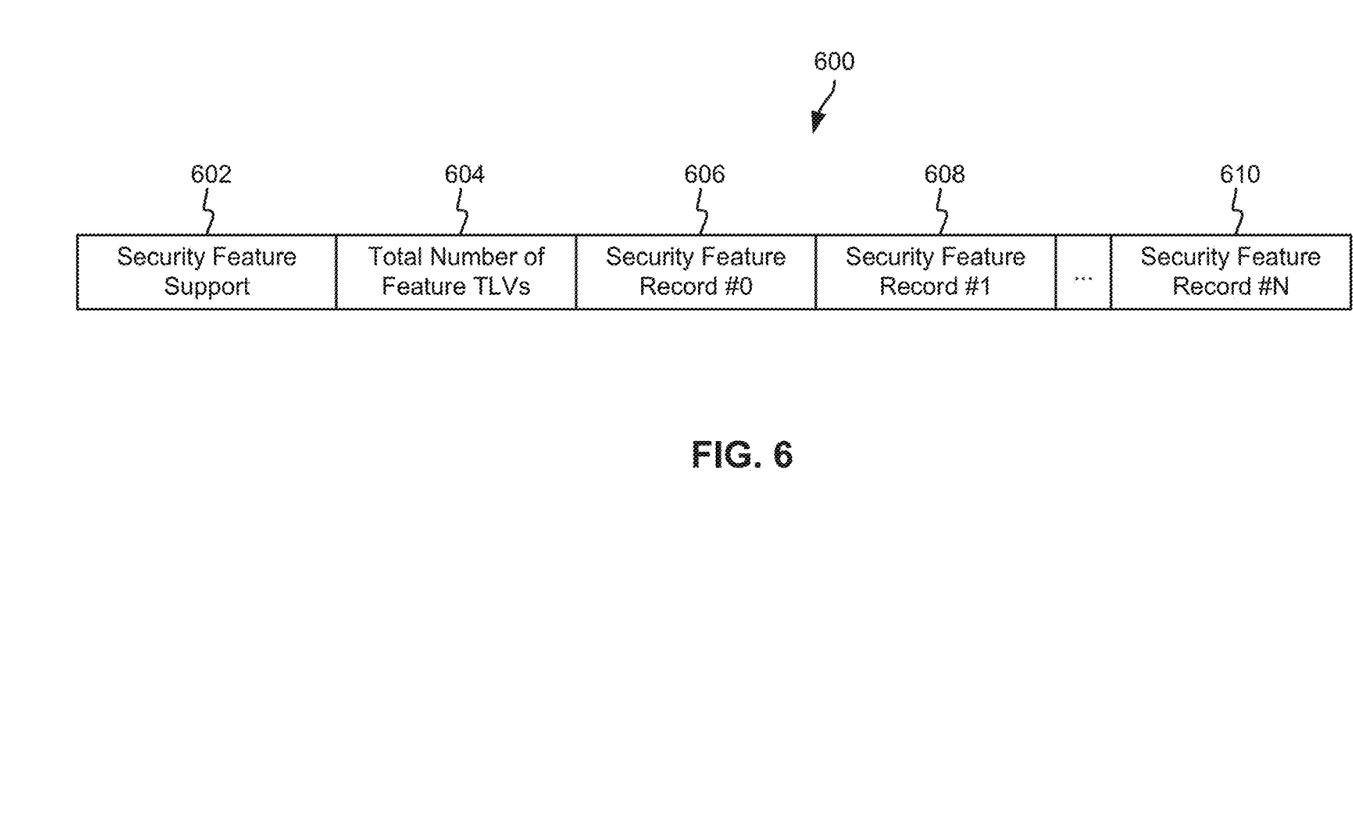
FIG. 6 shows a protocol data unit (PDU) format according to one embodiment.

FIG. 6 shows a PDU 600 that may be used to exchange security capabilities between an application or application instance and other intermediate device(s) and/or peer applications and/or application instances, in accordance with one embodiment. The SCEP may utilize this PDU 600 exclusively in a further embodiment to exchange security capabilities and/or features. Although a PDU is shown, any type of packet or frame may be used to exchange security capabilities and/or features in the SCEP as would be understood by one of skill in the art upon reading the present descriptions.

The SCEP PDU 600 includes a security feature support field 602, a field to indicate a total number of feature type-length-value tuples (TLVs) 604, and a plurality of security feature record fields (e.g., security feature record #0 606, security feature record #01 608, ... security feature record #0N 610), each security feature record field having a TLV stored therein. More fields may be included in the SCEP PDU 600 in various embodiments, the additional fields being utilized to further identify applications, security capabilities, security features, session availability, and other useful information for implementation of SCEP.

The security feature support field 602 may indicate a type of security feature that is enabled on the application/session/host that is sending the SCEP PDU 600. In one embodiment, the security feature support field 602 may have three values: a first value (e.g., 0) indicating hardware-based security features, a second value (e.g., 1) indicating operating system-based security features, and a third value (e.g., 2) indicating application-based security features. This field reflects the type of security features that are available on the source (e.g., application, application instance, etc.) of the SCEP PDU 600.

According to one approach, the total number of feature TLVs field 604 may indicate how many feature TLVs (security feature records) are included in the SCEP PDU 600. In one embodiment, a maximum of 25 security feature records may be included in one SCEP PDU 600. In other embodiments, more security feature records or less security feature records may be included in one SCEP PDU 600 depending on an overall length of the SCEP PDU 600. For example, when the SCEP PDU 600 includes 10 security feature records, the total number of feature TLVs field 604 has a value of 10.

In one embodiment, each security feature record (e.g., security feature record #0 606, security feature record #01 608, ... security feature record #0N 610) includes a TLV that represents a predetermined indicator of security features and capabilities that are available on the source of the SCEP PDU 600. For example, a numeric or alphanumeric value, such as a value of 1, may represent the presence of a firewall, a value of 2 may represent the presence of an IDS, a value of 3 may represent the presence of an IPS, a value of 4 may indicate the ability to perform data redaction, a value of 5 may indicate the ability to perform partial or full memory (database) redaction, a value of 6 may indicate the ability to perform full or partial encryption, etc. More or less values may be indicated by the TLVs, and any security features and/or capabilities, no matter how insignificant or disruptive may be indicated in a TLV, in various embodiments.

Figure 7:
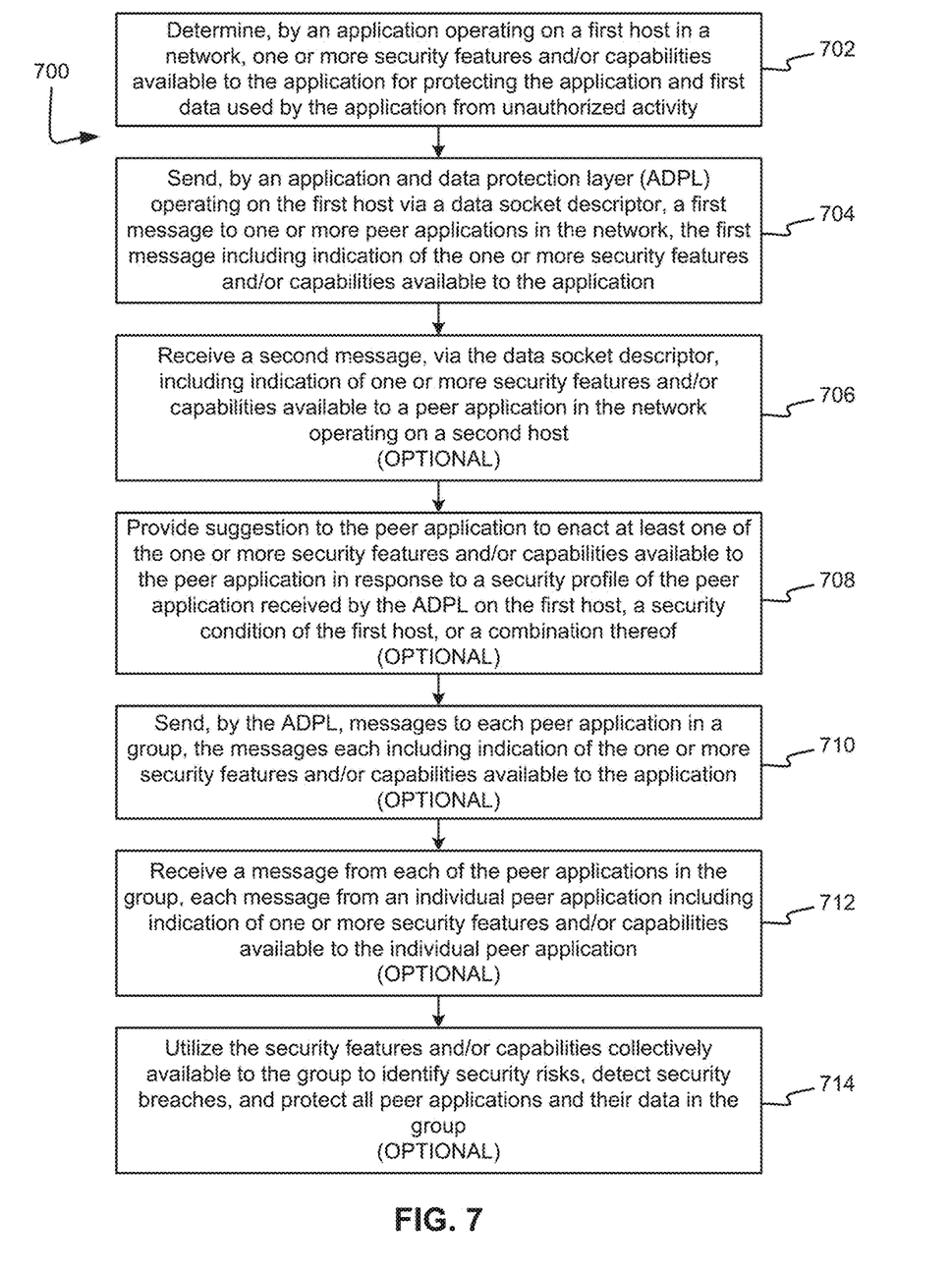
FIG. 7 shows a flowchart of a method, according to one embodiment.

Now referring to FIG. 7, a flowchart of a method 700 is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be apparent to one of skill in the art upon reading the present descriptions.

Each of the steps of the method 700 may be performed by any suitable component of the operating environment. For example, in various embodiments, the method 700 may be partially or entirely performed by a server, host, computing system, processor, switch, or some other device having one or more processing units therein. The processing unit, e.g., processing circuit(s), chip(s), and/or module(s) implemented in hardware and/or software, and preferably having at least one hardware component, may be utilized in any device to perform one or more steps of the method 700. Illustrative processing units include, but are not limited to, a central processing unit (CPU), an ASIC, a FPGA, etc., combinations thereof, or any other suitable computing device known in the art.

As shown in FIG. 7, method 700 may initiate with operation 702, where one or more security features and/or capabilities available to an application operating on a first host in a network for protecting the application and first data used by the application from unauthorized activity are determined.

In operation 704, a first message is sent to one or more peer applications in the network by an ADPL operating on the first host. The first message is sent via a data socket descriptor, and includes indication of the one or more security features and/or capabilities available to the application.

The first message may include a PDU packet (or some other suitable packet type) that includes a security feature support field indicating a type of security feature that is enabled on the first host selected from hardware-based security features, operating system-based security features, and application-based security features, a field configured to indicate a total number of feature TLVs, and a plurality of security feature record fields, each security feature record field having a TLV stored therein that indicates a predetermined indicator of security features and capabilities that are available to the application and the first host.

According to one embodiment, a maximum of 25 security feature records may be included in the plurality of security feature record fields.

In optional operation 706, a second message is received, via the data socket descriptor, including indication of one or more security features and/or capabilities available to a peer application in the network operating on a second host. These security features and/or capabilities available to the peer application on the second host may be the same as, similar to, or completely different from the security features and/or capabilities available to the application on the first host.

In optional operation 708, a suggestion may be provided to the peer application to enact at least one of the one or more security features and/or capabilities available to the peer application. This suggestion may be issued in response to a security profile of the peer application, which is received by the ADPL on the first host, a security condition of the application and/or the first host, or a combination of the security profile of the peer application and the security condition of the application and/or the first host.

In a further embodiment, instead of a mere suggestion, the ADPL may cause initiation of the one or more security features and/or capabilities available to the peer application.

In another embodiment, the security actions to be taken by peer applications may be informed to the peer applications via data socket APIs, standard APIs, and/or proprietary APIs modified by the ADPL on the various hosts.

In optional operation 710, messages may be sent to each peer application in a group. These messages may be sent by the ADPL on the first host, and the messages may each include indication of the one or more security features and/or capabilities available to the application. Through the collective use of these messages, an overall picture of the security functionality of the peer applications in the group is formed.

Moreover, in optional operation 712, a message from each of the peer applications in the group may be received (or as many of the peer applications that are able to respond). Each message from an individual peer application includes indication of one or more security features and/or capabilities available to the individual peer application on its host.

In a further optional operation 714, the security features and/or capabilities collectively available to the group may be utilized to identify security risks, detect security breaches, and protect all peer applications and their data in the group. The way in which these various security features and/or capabilities are utilized may be based on any information available to the members of the group, such as one or more security profiles exchanged between the peer applications in the group.

Any type of security risk may be defended against through this operation, such as malware, DDoS, data stealing, application breaches, etc.

According to one embodiment, the network may include a plurality of socket based applications, and upon establishment of the data socket descriptor with a peer application, each peer application in the session send over their own security capabilities and/or features to the peer application or to all peer applications in an established group.

Method 700 may be implemented as a system, process, or a computer program product. As a system, method 700 may be implemented on the first host and/or the second host as logic configured to perform method 700, along with being implemented on any other hosts on which secure communications are desired. As a computer program product, a computer readable storage medium may store program instructions configured to perform method 700.

For example, a system may include a processing circuit and logic integrated with and/or executable by the processing circuit. The processing circuit is a non-transitory hardware device configured to execute logic embedded therein, or provided thereto. Examples of processing circuits include, but are not limited to, CPUs, ASICs, FPGAs, microprocessors, integrated circuits, etc. The logic is configured to cause the processing circuit to execute method 700 in one embodiment.

In another example, a computer program product may include a computer readable storage medium having program instructions stored thereon. The computer readable storage medium is a non-transitory device configured to store program instructions that are executable and/or readable by a processing circuit. The program instructions are executable by a processing circuit to cause the processing circuit to perform method 700 in accordance with one embodiment.

Variations of the systems, methods, and computer program products described herein are also possible, and the explicit description thereof in this document is not required in order to provide those of skill in the art with the ability to conceive of such variations when reading the present descriptions.

What is claimed is:

1. A method, comprising:
   determining, by an application operating on a first host in a network, one or more security features and/or capabilities available to the application for protecting the application and first data used by the application from unauthorized activity;
   sending, by an application and data protection layer (ADPL) operating on the first host via a data socket descriptor, a first message to one or more peer applications in the network, the first message including indication of the one or more security features and/or capabilities available to the application;
   receiving a second message, via the data socket descriptor, including indication of one or more security features and/or capabilities available to a peer application in the network operating on a second host; and
   providing a suggestion to the peer application to enact at least one of the one or more security features and/or capabilities available to the peer application in response to:
   a security profile of the peer application received by the ADPL on the first host;
   a security condition of the first host; or
   a combination of the security profile of the peer application received by the ADPL on the first host and the security condition of the first host.

2. The method as recited in claim 1, further comprising:
   sending, by the ADPL, messages to each peer application in a group, the messages each including indication of the one or more security features and/or capabilities available to the application; and
   receiving a message from each of the peer applications in the group, each message from an individual peer application including indication of one or more security features and/or capabilities available to the individual peer application.

3. The method as recited in claim 2, further comprising utilizing the security features and/or capabilities collectively available to the group to identify security risks, detect security breaches, and protect all peer applications and their data in the group.

4. The method as recited in claim 3, wherein utilization of the security features and/or capabilities collectively available to the group is based on one or more security profiles exchanged between the peer applications in the group.

5. The method as recited in claim 1, wherein the first message comprises a protocol data unit (PDU) packet comprising:
   a security feature support field indicating a type of security feature that is enabled on the first host selected from hardware-based security features, operating system-based security features, and application-based security features;
   a field configured to indicate a total number of feature type-length-value tuples (TLVs); and
   a plurality of security feature record fields, each security feature record field having a TLV stored therein that indicates a predetermined indicator of security features and capabilities that are available to the application and the first host.

6. The method as recited in claim 5, wherein a maximum of 25 security feature records are included in the plurality of security feature record fields.

7. A system, comprising:
a processing circuit and logic integrated with and/or executable by the processing circuit, the logic being configured to cause the processing circuit to:
determine, by an application operating on a first host in a network, one or more security features and/or capabilities available to the application for protecting the application and first data used by the application from unauthorized activity; and
send, by an application and data protection layer (ADPL) operating on the first host via a data socket descriptor, a first message to one or more peer applications in the network, the first message including indication of the one or more security features and/or capabilities available to the application;
receive, by the application operating on the first host, a second message, via the data socket descriptor, including indication of one or more security features and/or capabilities available to a peer application in the network operating on a second host; and
provide, by the application operating on the first host, a suggestion to the peer application to enact at least one of the one or more security features and/or capabilities available to the peer application in response to:
a security profile of the peer application received by the ADPL on the first host;
a security condition of the first host; or
a combination of the security profile of the peer application received by the ADPL on the first host and the security condition of the first host.

8. The system as recited in claim 7, wherein the logic is further configured to cause the processing circuit to:
send, by the ADPL, messages to each peer application in a group, the messages each including indication of the one or more security features and/or capabilities available to the application; and
receive a message from each of the peer applications in the group, each message from an individual peer application including indication of one or more security features and/or capabilities available to the individual peer application.

9. The system as recited in claim 8, wherein the logic is further configured to cause the processing circuit to utilize the security features and/or capabilities collectively available to the group to identify security risks, detect security breaches, and protect all peer applications and their data in the group.

10. The system as recited in claim 9, wherein utilization of the security features and/or capabilities collectively available to the group is based on one or more security profiles exchanged between the peer applications in the group.

11. The system as recited in claim 7, wherein the first message comprises a protocol data unit (PDU) packet comprising:
a security feature support field indicating a type of security feature that is enabled on the first host selected from hardware-based security features, operating system-based security features, and application-based security features;

a field configured to indicate a total number of feature type-length-value tuples (TLVs); and
a plurality of security feature record fields, each security feature record field having a TLV stored therein that indicates a predetermined indicator of security features and capabilities that are available to the application and the first host.

12. A computer program product, comprising a non-transitory computer readable storage medium having program instructions stored thereon, the program instructions being executable by a processing circuit to cause the processing circuit to:
determine, by an application operating on a first host in a network, one or more security features and/or capabilities available to the application for protecting the application and first data used by the application from unauthorized activity; and
send, by an application and data protection layer (ADPL) operating on the first host via a data socket descriptor, a first message to one or more peer applications in the network, the first message including indication of the one or more security features and/or capabilities available to the application;
receive a second message, via the data socket descriptor, including indication of one or more security features and/or capabilities available to a peer application in the network operating on a second host; and
provide a suggestion to the peer application to enact at least one of the one or more security features and/or capabilities available to the peer application in response to:
a security profile of the peer application received by the ADPL on the first host;
a security condition of the first host, or
both the security profile of the peer application received by the ADPL on the first host, and the security condition of the first host.

13. The computer program product as recited in claim 12, wherein the program instructions further cause the processing circuit to:
send, by the ADPL, messages to each peer application in a group, the messages each including indication of the one or more security features and/or capabilities available to the application;
receive a message from each of the peer applications in the group, each message from an individual peer application including indication of one or more security features and/or capabilities available to the individual peer application; and
utilize the security features and/or capabilities collectively available to the group to identify security risks, detect security breaches, and protect all peer applications and their data in the group, wherein utilization of the security features and/or capabilities collectively available to the group is based on one or more security profiles exchanged between the peer applications in the group.

14. The computer program product as recited in claim 12, wherein the first message comprises a protocol data unit (PDU) packet comprising:
a security feature support field indicating a type of security feature that is enabled on the first host selected from hardware-based security features, operating system-based security features, and application-based security features;
a field configured to indicate a total number of feature type-length-value tuples (TLVs); and a plurality of security feature record fields, each security feature record field having a TLV stored therein that indicates a predetermined indicator of security features and capabilities that are available to the application and the first host.

* * * * *